(12) United States Patent
Stanich et al.

(10) Patent No.: US 11,755,865 B1
(45) Date of Patent: Sep. 12, 2023

(54) DROP SIZE MONITORING MECHANISM

(71) Applicants: Mikel Stanich, Boulder, CO (US);
Walter F. Kailey, Boulder, CO (US);
Ziling Zhang, Boulder, CO (US);
Nikita Gurudath, Boulder, CO (US);
Samuel Hopper, Boulder, CO (US)

(72) Inventors: Mikel Stanich, Boulder, CO (US);
Walter F. Kailey, Boulder, CO (US);
Ziling Zhang, Boulder, CO (US);
Nikita Gurudath, Boulder, CO (US);
Samuel Hopper, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/684,252

(22) Filed: Mar. 1, 2022

(51) Int. Cl.
*G06K 15/02* (2006.01)

(52) U.S. Cl.
CPC .............................. *G06K 15/1881* (2013.01)

(58) Field of Classification Search
CPC .................................................. G06K 15/1881
USPC .......................................................... 358/1.9
See application file for complete search history.

(56) References Cited

U.S. PATENT DOCUMENTS

| | | | |
|---|---|---|---|
| 6,554,388 B1 | 4/2003 | Wong et al. | |
| 7,296,882 B2 | 11/2007 | Korn et al. | |
| 7,423,778 B2 | 9/2008 | Hersch et al. | |
| 7,425,061 B2 | 9/2008 | Buehler et al. | |
| 8,100,057 B2 | 1/2012 | Hartmann et al. | |
| 8,576,450 B2 | 11/2013 | Shepherd | |
| 8,734,034 B2 | 5/2014 | Morovic et al. | |

(Continued)

FOREIGN PATENT DOCUMENTS

| | | |
|---|---|---|
| CN | 108031573 | 5/2018 |
| EP | 0454448 | 10/1991 |

(Continued)

OTHER PUBLICATIONS

Reis, N., Ainsley, C. & Derby, B. Ink-Jet Delivery of Particle Suspensions by Piezoelectric Droplet Ejectors. Journal of Applied Physics. May 1, 2005;97(9);094903.

(Continued)

*Primary Examiner* — Jacky X Zheng
(74) *Attorney, Agent, or Firm* — Jaffery Watson Mendonsa & Hamilton LLP

(57) ABSTRACT

A system is disclosed. The system includes at least one physical memory device to store drop size logic and one or more processors coupled with the at least one physical memory device to execute the drop size logic to receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module, receive first ink drop size data for each of a plurality of color planes associated with the first halftone design and the first transfer function, receive second ink usage drop fraction data for each of the plurality of color planes associated with the first halftone design, a second transfer function and the print job data and generate second ink drop size data for each of the plurality of color planes based on the first ink usage drop fraction data, the first ink drop size data and the second ink usage drop fraction data.

20 Claims, 10 Drawing Sheets

(56) References Cited

U.S. PATENT DOCUMENTS

| | | | |
|---|---|---|---|
| 8,923,713 | B2 | 12/2014 | Terao et al. |
| 9,056,485 | B2 | 6/2015 | Szafraniec |
| 9,096,056 | B2 | 8/2015 | Zhou et al. |
| 9,102,157 | B2 | 8/2015 | Prothon et al. |
| 9,132,629 | B2 | 9/2015 | Ward et al. |
| 9,656,463 | B1 * | 5/2017 | Ernst .................. B41J 2/04581 |
| 9,785,873 | B2 | 10/2017 | Stanich et al. |
| 9,832,428 | B2 | 11/2017 | Hauf |
| 9,967,429 | B2 | 5/2018 | Nakano |
| 10,129,436 | B2 | 11/2018 | Kimura |
| 10,214,038 | B2 | 2/2019 | Klinger |
| 10,237,452 | B2 | 3/2019 | Rius Rossell et al. |
| 10,338,496 | B2 | 7/2019 | Able et al. |
| 10,500,849 | B1 | 12/2019 | Ernst et al. |
| 10,643,115 | B1 | 5/2020 | Kailey |
| 10,723,133 | B2 | 7/2020 | Ferreri et al. |
| 10,902,304 | B1 | 1/2021 | Stanich et al. |
| 10,990,863 | B1 | 4/2021 | Stanich et al. |
| 11,072,166 | B2 | 7/2021 | Kailey et al. |
| 11,283,936 | B1 * | 3/2022 | Stanich ................ H04N 1/2392 |
| 2002/0051151 | A1 | 5/2002 | Ohshima |
| 2003/0179410 | A1 | 9/2003 | Velde |
| 2007/0024649 | A1 | 2/2007 | Reinten |
| 2013/0101328 | A1 | 4/2013 | Morovic et al. |
| 2013/0335780 | A1 | 12/2013 | Asai |
| 2014/0210898 | A1 | 7/2014 | Mantell et al. |
| 2017/0259560 | A1 | 9/2017 | Sreenivasan et al. |
| 2018/0234582 | A1 | 8/2018 | Stanich et al. |
| 2019/0224966 | A1 | 7/2019 | Gracia Verdugo et al. |
| 2019/0268482 | A1 | 8/2019 | Stanich et al. |
| 2019/0270304 | A1 | 9/2019 | Stanich et al. |
| 2020/0012908 | A1 | 1/2020 | Miyazaki et al. |
| 2020/0108621 | A1 | 4/2020 | Ferreri et al. |

FOREIGN PATENT DOCUMENTS

| | | |
|---|---|---|
| EP | 1106371 | 1/2006 |
| EP | 2313272 | 2/2010 |
| JP | 5157578 | 3/2013 |
| JP | 2018174143 | 11/2018 |
| WO | 0202338 | 1/2002 |
| WO | 2018022077 | 2/2018 |

OTHER PUBLICATIONS

Dijksman, J. F., et al. Precision inkjet printing of polymer light emitting displays Journal of Materials Chemistry 17.6 (2007): 511-522.

Link, N., & Semiat, R. (2009). Ink drop motion in wide-format printers: I. Drop flow from Drop-On-Demand (DOD) printing heads. Chemical Engineering and Processing: Process Intensification, 48(1), 68-83.

Slavuj, R., Coppel, L. G., & Hardeberg, J. Y. (Feb. 2015). Effect of ink spreading and ink amount on the accuracy of the Yule-Nielsen modified spectral Neugebauer model. In Color Imaging XX: Displaying, Processing, Hardcopy, and Applications (vol. 9395, p. 93950E). International Society for Optics and Photonics.

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/ma9110910. See highlighted and underlined sections.

U.S. Appl. No. 17/126,659 entitled Ink Usage Estimation for Each Drop Size Based On Histogram and Calibrated Drop Fraction filed Dec. 18, 2020, 50 pages.

Office Action for U.S. Appl. No. 17/693,570, dated May 10, 2023, 6 pages.

* cited by examiner

DROP SIZE MONITORING MECHANISM

FIELD OF THE INVENTION

The invention relates to the field of image reproduction, and in particular, to performing ink drop size monitoring for a printing system.

BACKGROUND

In commercial and transactional printers, it is common to estimate ink usage to determine one of the major components of the cost to print a job with an ink jet printer. Currently, ink estimation methods may be implemented to estimate an amount of ink used to print a print job (e.g., ink usage) without needing to print the print job. This estimation typically uses ink drop sizes, along with the number of drops associated with each different ink drop size for the print job.

However, over time the print system must typically be calibrated to maintain a factory-set response for the printer used to print the job data. As a result of calibration, the ink drop sizes may change. Current knowledge or control of ink drop sizes is needed so that other processes that use ink drop sizes remain accurate.

Accordingly, a mechanism to monitor and adjust ink drop sizes is desired.

SUMMARY

In one embodiment, a system is disclosed. The system includes at least one physical memory device to store drop size logic and one or more processors coupled with the at least one physical memory device to execute the drop size logic to receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module, receive first ink drop size data for each of a plurality of color planes associated with the first halftone design and the first transfer function, receive second ink usage drop fraction data for each of the plurality of color planes associated with the first halftone design, a second transfer function and the print job data and generate second ink drop size data for each of the plurality of color planes based on the first ink usage drop fraction data, the first ink drop size data and the second ink usage drop fraction data.

BRIEF DESCRIPTION OF THE DRAWINGS

A better understanding of the present invention can be obtained from the following detailed description in conjunction with the following drawings, in which.

DETAILED DESCRIPTION

An ink drop size monitoring and adjustment mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
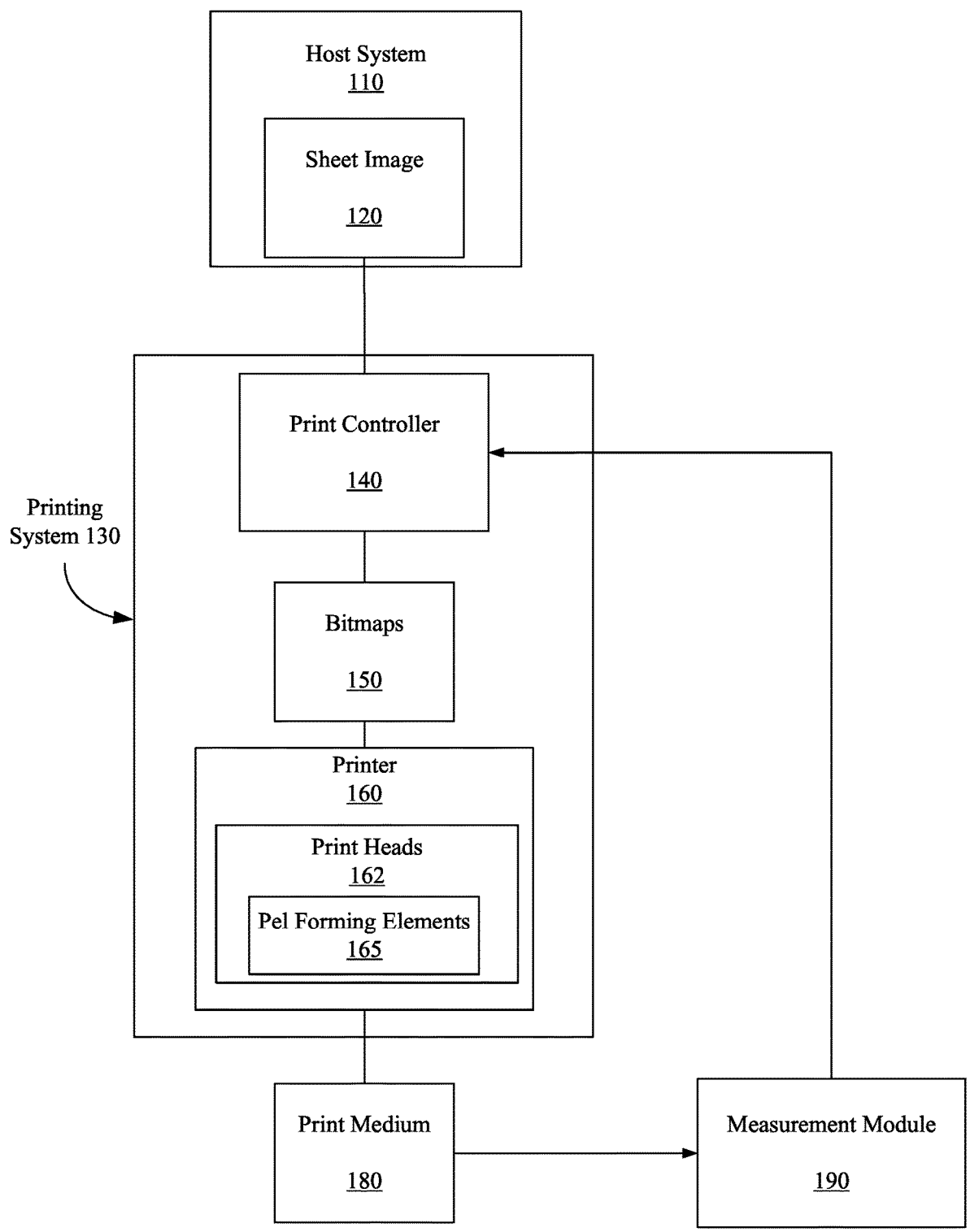
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle).

According to one embodiment, pel forming elements may be grouped onto one or more printheads (e.g., printhead array). The pel forming elements 165 may be stationary (e.g., as part of a stationary printhead) or moving (e.g., as part of a printhead that moves across the print medium 180) as a matter of design choice. In a further embodiment, pel forming elements 165 may be assigned to one of one or more color planes that correspond to types of marking materials (e.g., Cyan, Magenta, Yellow, and blacK (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 contains the instructions (e.g., instructed ink drop size and/or location) for the one or more printheads 162 and pel forming elements 165. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a measurement system to obtain measurements of the printed medium 180. The measured results are communicated to print controller 140 to be used in a compensation process (e.g., halftone calibration, uniformity, etc.). The measurement system may be a stand-alone process or be integrated into the printing system 130.

According to one embodiment, measurement module 190 may include a sensor to take optical measurements of printed images on print medium 180. Measurement module 190 may generate and transmit measurement data. Measurement data may be OD (e.g., optical density), perceptual lightness (e.g., L* in the CIELAB color space L;*a*b*) and/or scanned image (e.g., RGB) data corresponding to a printed image. In one embodiment, measurement module 190 may comprise one or more sensors that individually or in total take measurements for printed markings produced for some or all pel forming elements 165. In another embodiment, measurement module 190 may be a camera system, in-line scanner, densitometer or spectrophotometer.

In a further embodiment, measurement data may include map information to correlate portions of the measurement data (e.g., OD data) to the corresponding pel forming elements 165 that contributed to the portions of the measurement data. In another embodiment, the print instructions for a test pattern (e.g., step chart, test print job) provides the correlation of the portions of the measurement data to the corresponding pel forming elements that contributed to the portions of the measurement data.

Figure 2A:
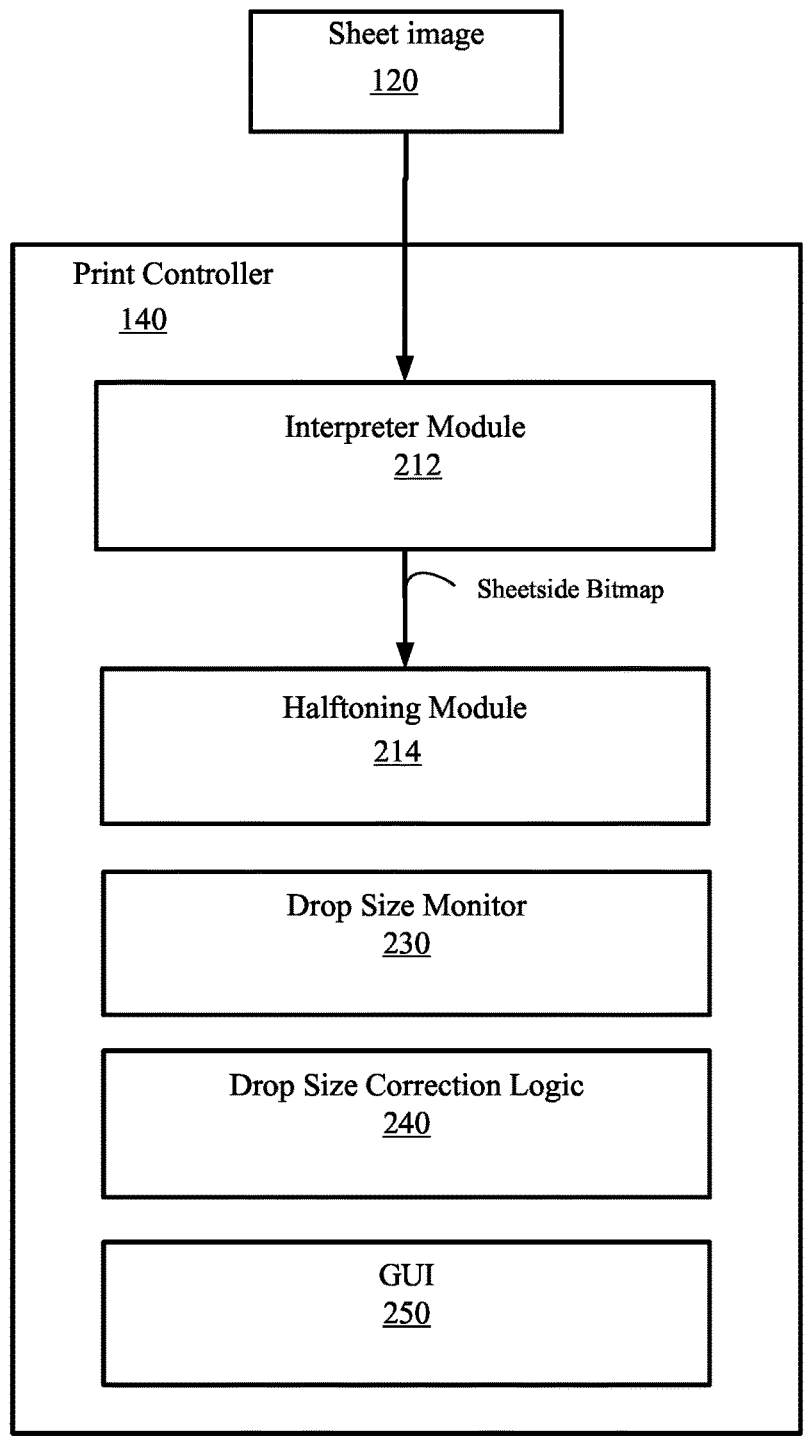
FIGS. 2A&2B are block diagrams illustrating embodiment of a print controller.
Figure 2B:
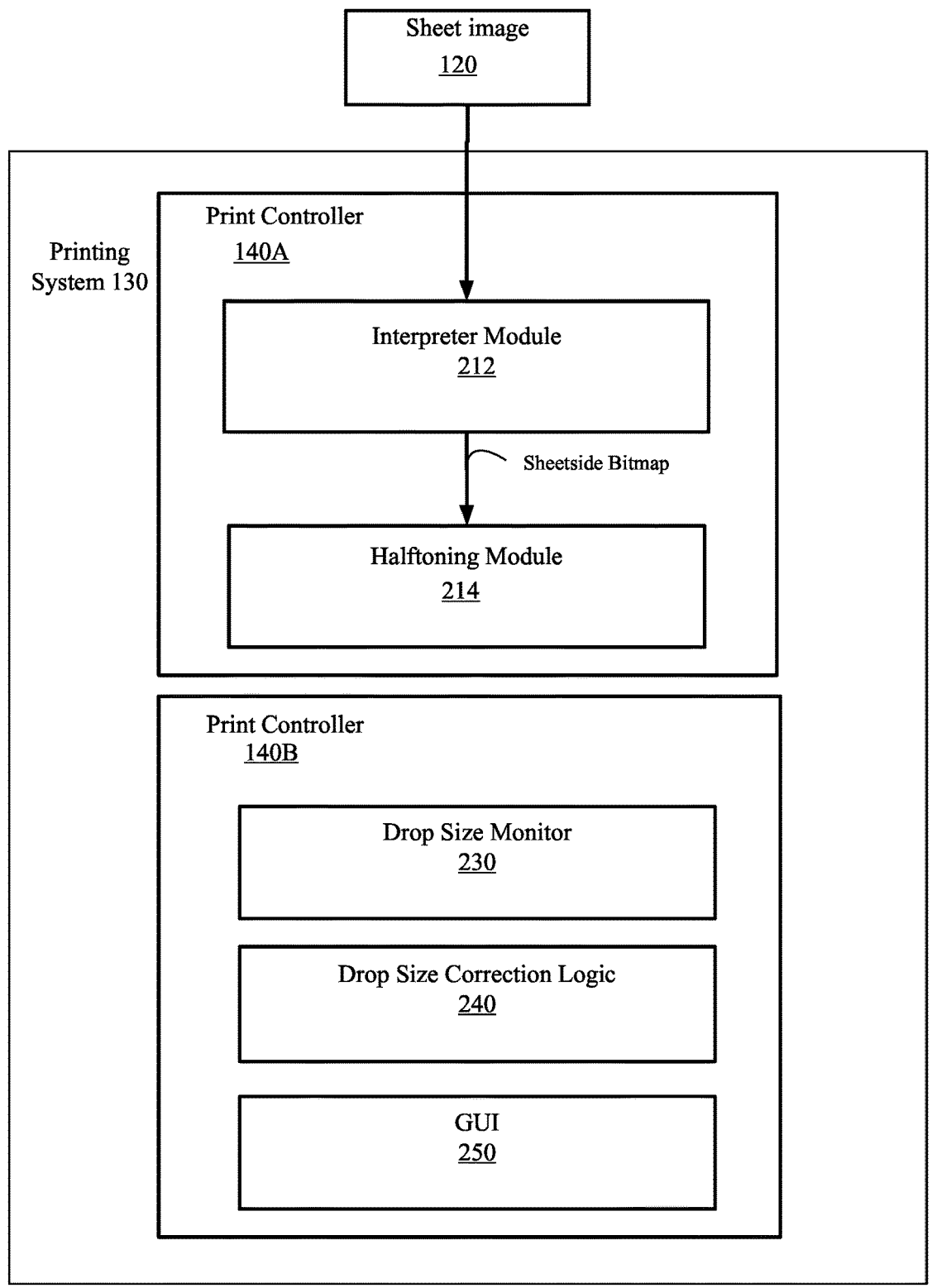

FIGS. 2A&2B illustrate embodiments implementing print controllers 140. FIG. 2A illustrates a print controller 140 (e.g., DFE or digital front end), in its generalized form, including interpreter module 212, halftoning module 214, drop size monitor 230 and drop size correction logic 240, while FIG. 2B illustrates an embodiment having print controllers 140A&140B. In this embodiment, print controller 140A includes interpreter module 212 and halftoning module 214, and print controller 140B includes drop size monitor 230 and drop size correction logic 240. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (CTI) is transformed by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size. The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off).

To use these threshold arrays for halftoning, each multibit threshold array is tiled across contone image data provided by the sheetside bitmap, which provides a set of threshold values for each pixel in the sheetmap. The contone image data (e.g., digital count, gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and the image contone data is less than or equal to the large drop thresholds in plane 1. Small drops are produced when the image contone data is greater than the small drop thresholds in plane 3 and the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Drop size monitor 230 is implemented to determine monitored ink drop size data. In one embodiment, drop size monitor 230 receives initial (or first) ink usage drop fraction data associated with a halftone design (or first halftone design), an initial (or first) transfer function and print job data; and initial (or first) ink drop size data for each of a plurality of color planes associated with a halftone design (or first halftone design) and an initial (or first) transfer function, receives monitored (or second) ink usage drop fraction data for each of the plurality of color planes associated with the halftone design (or first halftone design), an adjusted (or second) transfer function and the print job data and generates monitored (or second) ink drop size data for each of the plurality of color planes based on the first ink usage drop fraction data, the first ink drop size data and the second ink usage drop fraction data. In such an embodiment, ink usage drop fraction data represents the fraction of ink drops for each instructed drop size corresponding to each input digital count for a halftoning module.

In a further embodiment, the first and second ink usage drop fraction data is generated for each of a plurality of digital count (DC) levels (e.g., gray levels) using the halftone design, corresponding transfer function and the print job data. In yet a further embodiment, drop size monitor 230 receives a message indicating one or more regions of interest to generate the monitored ink drop size data and generates the monitored ink drop size data for each of the one or more regions of interest. In such an embodiment, a region of interest may comprise a printhead, a printhead array or a pel forming element. A technical advantage of monitoring ink drop size for a region of interest rather than the entire print system is to identify the specific print system element (e.g., printhead, a printhead array or a pel forming element) that needs corrective action. In still a further embodiment, drop size monitor 230 detects a difference between the initial (or first) drop size data and the monitored drop size data and determines whether the difference between the initial drop size data and the monitored drop size data exceeds a predetermined threshold. A technical advantage for detecting that a difference between drop size data exceeds a threshold is that this detection information indicates that corrective actions should be taken on the systems related to the ink drop sizes.

Figure 3:
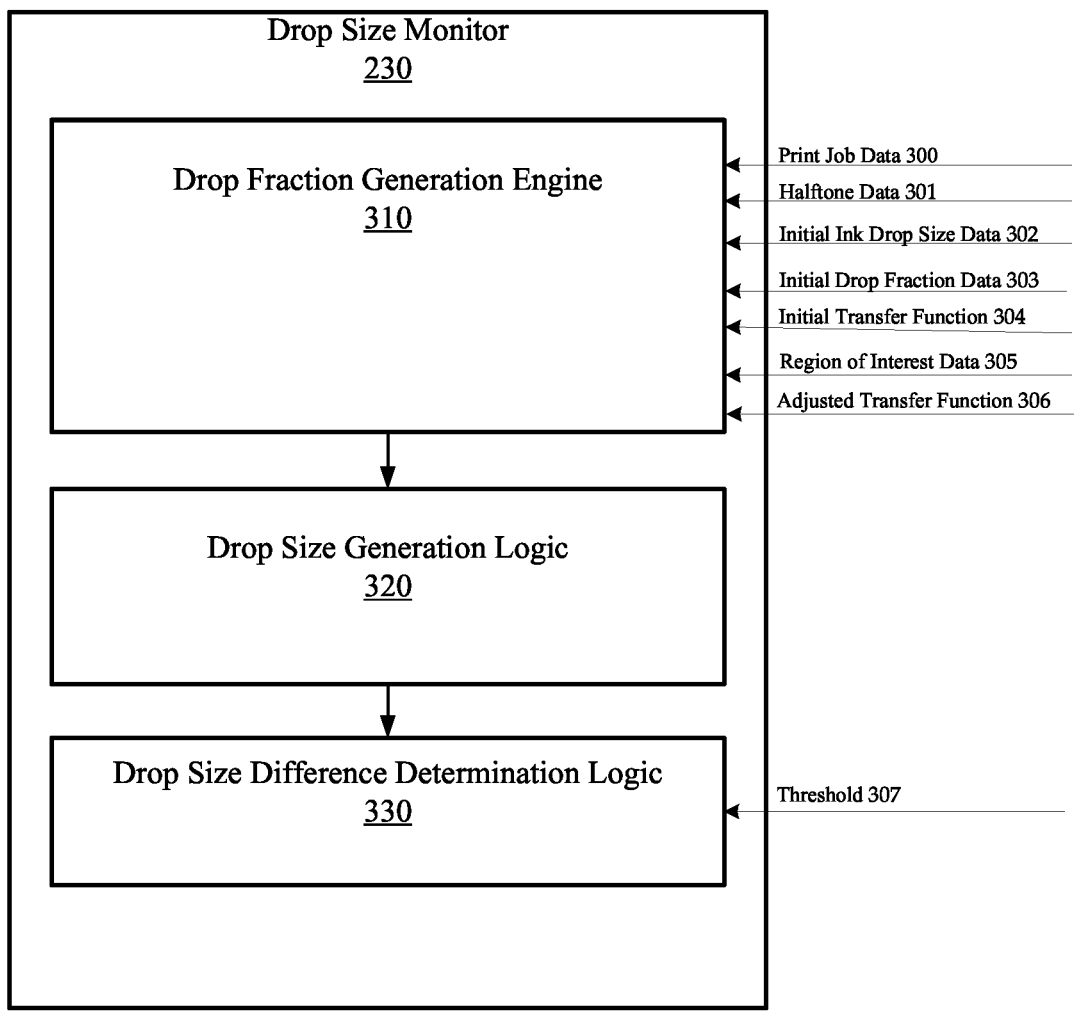
FIG. 3 illustrates one embodiment of drop size monitor.

FIG. 3 illustrates one embodiment of drop size monitor 230. As shown in FIG. 3, drop size monitor 230 includes a drop fraction generation engine 310 that is implemented to generate the initial ink usage drop fraction data. In one embodiment, drop fraction generation engine 310 receives print job data 300, halftone data 301, initial ink drop size data 302 that represents quantitative ink drop amounts corresponding to each instructed ink drop size, initial ink drop fraction data 303 (e.g., first ink usage drop fraction data) and/or an initial transfer function 304. Additionally, drop fraction generation engine 310 receives region of interest data 305 (e.g., via GUI 250).

In embodiments, ink drop size data may comprise a volume or a mass expressed in quantities of standardized units (e.g., metric system units such as grams or liters). Ink drop fractions indicate a percentage of drops for each drop size at each gray level, such that a the total number of drops of a specific drop size X at DC=dropFraction_X(DC)*total number of pels in halftone array. Alternately for the region of interest drop fraction, the total number of drops of a specific drop size X at DC=dropFraction_X(DC)*total number of pels in the region of interest. Additionally, a transfer function comprises a mapping of an input digital count to an output digital count for a system.

Drop fraction generation engine 310 uses halftone data 301, initial transfer function 304 and print job data to generate the initial ink usage drop fraction data for a region of interest indicated in the region of interest data 305. As discussed above, the region of interest may comprise a region associated with a single printhead 162, an array of printheads 162, a single pel forming element 165 or a set of pel forming elements 165.

In one embodiment, drop fraction generation engine 310 generates the initial ink usage drop fraction data by processing a synthetic job (e.g., print job or test print job data) using halftone data 301 and initial transfer function 304. In this embodiment, the synthetic job comprises a constant tint level for each gray level available in the halftone design with the un-calibrated halftone design to count the number of drops of each instructed size (e.g., None, Small, Medium or Large), for each different tint level in the synthetic job. The synthetic job used for the drop fraction analysis has the same tint levels for each pel of the image and includes images for each gray level, where the size of the images in the job matches the print size of the region of interest (e.g., if the region of interest is a printhead, the image is sized to print the pel forming elements of the printhead). For example, the synthetic job may consist of 256 images, each image having the same gray level for all the pels in the image, where each different image is generated using a different gray level. The gray levels range from zero to level 255. Furthermore, the size of each image is the same as the region of interest. The region of interest relates physical elements such as nozzle, printhead or printhead array. Using the synthetic image approach, the drop fractions are determined for the pel forming elements corresponding to the region of interest, specifically the columns in the threshold array that are employed when printing the region of interest. The synthetic image is aligned such that the pel forming elements comprising the region of interest are used.

According to one embodiment, the initial ink usage drop fraction data comprises an initial ink usage drop fraction matrix ($Z^0$) for an initial halftone threshold array and an initial ink drop size vector ($v^0$) (note that this may alternatively be called a matrix), as represented by:

$$Z^0 = \begin{bmatrix} z^0_{0,0} & \cdots & z^0_{0,D-1} \\ \vdots & \ddots & \vdots \\ z^0_{P-1,0} & \cdots & z^0_{P-1,D-1} \end{bmatrix}; \text{ and } v^0 = \begin{bmatrix} v^0_0 \\ \vdots \\ v^0_{D-1} \end{bmatrix},$$

As shown above, the initial ink usage drop fraction matrix comprises a set of $Z^0_{p,d}$ a matrix elements, each corresponding to a digital count level (p) and instructed ink drop size (d). In one embodiment, each element is associated with a digital count level (p) and an instructed drop size d. In such an embodiment, digital count (e.g., [0,(2^Bitdepth)−1]) is the gray level or color value for the different images in the synthetic image job. Bitdepth defines the number of available levels as a power of two. In the previously cited example, the bitdepth is 8, producing 256 total images in the synthetic image job used to determine drop fractions.

Index p ranges from zero to P−1, where P is the total number of digital count levels. Index d ranges from zero to D−1, where D is the total number of instructed ink drop sizes, not including the ink drop size none. The ink drop size column vector $v_0$ comprises ink amount values (e.g., $v_0$–$v_{D-1}$) associated with each of the plurality of instructed ink drop sizes in the initial drop size matrix. In a further embodiment, the drop amounts $v_0$–$v_{D-1}$ are known (e.g., experimentally pre-determined).

Drop fraction generation engine 310 also generates the monitored ink usage drop fraction data based on the halftone data 301, an adjusted transfer functions 306 and the print job data (e.g., test job, synthetic job). In one embodiment, drop fraction generation engine 310 counts the number of drops and determines drop fractions of each instructed drop size (e.g., at each digital count) for one or more specified regions of interest by processing the print job data (e.g., test job, synthetic job data) with the halftone data 301 and the adjusted (e.g., compensated) transfer functions represented by adjusted transfer function 306 (e.g., second transfer function or compensated transfer function). In such an embodiment, the adjusted transfer function is used to restore a target factory-set response as printer 160 is used to print the print job data. For example, a target linear optical density (OD) response may be maintained. Therefore, the initial transfer functions and the adjusted transfer functions have been determined using a calibration process to achieve the same linear optical density response using the same Dmax value. Where Dmax represents the OD at level (2^Bitdepth)−1.

It is well known that to achieve the same calibrated response the same ink deposition values for each individual color are required. Therefore, at each level the same amount of ink deposition or ink amount is required to produce the same optical density at that level for the initial and adjusted printhead designs. Achieving the same ink amount is equivalent to achieving the same ink deposition since the threshold array areas or area of the synthetic images are the same for the two different ink usage drop fraction data (e.g., initial usage drop fraction data and monitored ink usage drop fraction data).

The monitored ink usage drop fraction data comprises monitored ink usage drop fraction matrix (Z) for the initial threshold array with the adjusted transfer function 306 applied to the levels in the synthetic image, generated by calibrating the initial threshold array to the same calibrated response as the initial threshold array. The monitored ink usage drop size vector (v) is to be determined. (Z) and (v) are represented by:

$$Z = \begin{bmatrix} z^0_{0,0} & \cdots & z^0_{0,D-1} \\ \vdots & \ddots & \vdots \\ z^0_{P-1,0} & \cdots & z^0_{P-1,D-1} \end{bmatrix}; \text{ and } v = \begin{bmatrix} v_0 \\ \vdots \\ v_{D-1} \end{bmatrix},$$

Similar to the discussion above with reference to the initial ink usage drop fraction matrix, the monitored ink usage drop fraction matrix is comprised of a set of $Z_{p,d}$ elements, each corresponding to a different digital count level (p) and different instructed ink drop size (d), where P is the total number of digital count levels in the synthetic image job and D is the total number of instructed ink drop sizes, not including the none drop size. The monitored ink drop size column vector, v comprises unknown ink drop size values (e.g., $v_0$–$v_{D-1}$) associated with each of the plurality of drop sizes in the monitored ink usage drop fraction matrix. Therefore, each individual new estimate for the unknown ink usage drop fraction vector elements will have a corresponding value in the original column vector. The vector of new drop sizes v reflects the impact of the recalibration that was performed to achieve the same calibrated printer response associated with $v^0$.

In another embodiment, changes to drop fraction are due to changes in halftone design and/or changes to the calibration Transfer Functions (TF). In this case we have two adjusted transfer functions, one used for the initial threshold array and a second one used for the drop size monitored threshold array. The impact of the calibration TFs in this case will modify synthetic image print job data and consequently modify the ink drop fractions. Furthermore we can have a case where the initial and the drop size monitored threshold arrays are both calibrated and each one has an associated adjusted transfer function. In this case the synthetic job drop fractions are determined with the respective transfer functions applied to the image data and using the two different threshold arrays. Therefore, the described method applies to systems that are calibrated (e.g., employing calibrated halftones or halftones with transfer functions or calibrated halftones and transfer functions). The requirement is that the drop fractions reflect the impact of halftone design changes and transfer functions. The transfer function in this case would be applied to all of the pels in the image data for the synthetic image job that is analyzed. The analysis is performed using the initial threshold array and its respective transfer function to determine the $Z^0$ drop fractions and the drop fractions for the Z matrix are determined using the drop size monitored threshold array and its respective transfer function. In this case the different digital count levels p refer to the digital count levels in the synthetic job prior to applying the transfer functions. Therefore, we have a matching set of synthetic images to analyze having the same number of levels and drop sizes in the $Z^0$ and Z drop fraction matrices.

Drop size monitor also includes drop size generation logic 320 that is implemented to determine monitored ink drop size data (e.g., current ink drop size data or second ink drop size data) for one or more specified regions of interest based on the initial ink usage drop fraction data and monitored ink usage drop fraction data generated at drop fraction generation engine 310, as well as initial ink drop size data 302. Since constant ink deposition (ink amount per unit area) in a calibrated printer is known to produce the same printed OD, and ink deposition for each digital count level is constant for the same printed job, drop size generation logic 320 may generate the monitored ink drop size data from the monitored ink usage drop fraction data, initial ink usage drop fraction data and initial ink drop size data 302.

Also, since the ink amounts at each DC level are approximately equivalent to the monitored ink amounts for each digital count level, described by the matrix product of drop fraction matrix and drop size column vectors (Zv≈$Z^0$ $v^0$). As a result:

$$\hat{v}=Z^\# Z^0 v^0,$$

where # is the pseudo-inverse operator, (e.g., $A^\#=(A^T A)^{-1} A^T$ for a rectangular matrix A), where $\hat{v}$ denotes the estimated value of the drop size column vector v. This assumes that the same synthetic image print job is processed by drop fraction engine 310 to produce the pairs of the ink drop fraction data (e.g., initial ink drop fraction data and monitored ink drop fraction data or first and second ink drop fraction data, etc.) for each digital count level. Where the digital count levels are the initial synthetic chart levels prior to applying transfer functions if transfer functions are used. This provides an estimate for a new set of monitored drop sizes $\hat{v}$. Since $\hat{v}$ is a vector, this provides an estimate for each one of the individual drop sizes in a multibit system.

By association in the described methods, the determined drop sizes are specific to the region of interest. As explained above, by specifying the sizes of the images of the synthetic job to match the size of the region of interest, the size of both the initial ink usage drop fraction matrix and the monitored ink usage drop fraction matrix match the size of the region of interest. Furthermore, the location of the regions of interest are selected to match the pel forming elements that are to be considered for drop size determination. Alternately, if the images of the synthetic job did not match the size of the region of interest, then the synthetic image can be padded (e.g., insert zero level values for pels beyond the size of the region of interest) and the drop fraction are effectively the same size as the region of interest for these calculations. The pels in the unpadded region are then used to determine drop fractions with this method.

Drop size monitor 230 also includes drop size difference determination logic 330 that determines a difference between the initial ink drop size data and the generated monitored ink drop size data. Drop size difference determination logic 330 may also determine whether the difference between the initial ink drop size data and the generated monitored ink drop size data is greater than a threshold 306. The drop size differences may be determined for each of the instructed drop sizes (the instructed size none may be ignored) using the drop size data that corresponds to the instructed drop sizes. In one embodiment, a message may be transmitted upon a determination that the difference between the initial ink drop size data and the generated monitored ink drop size data is greater than threshold 306.

Figure 4A:
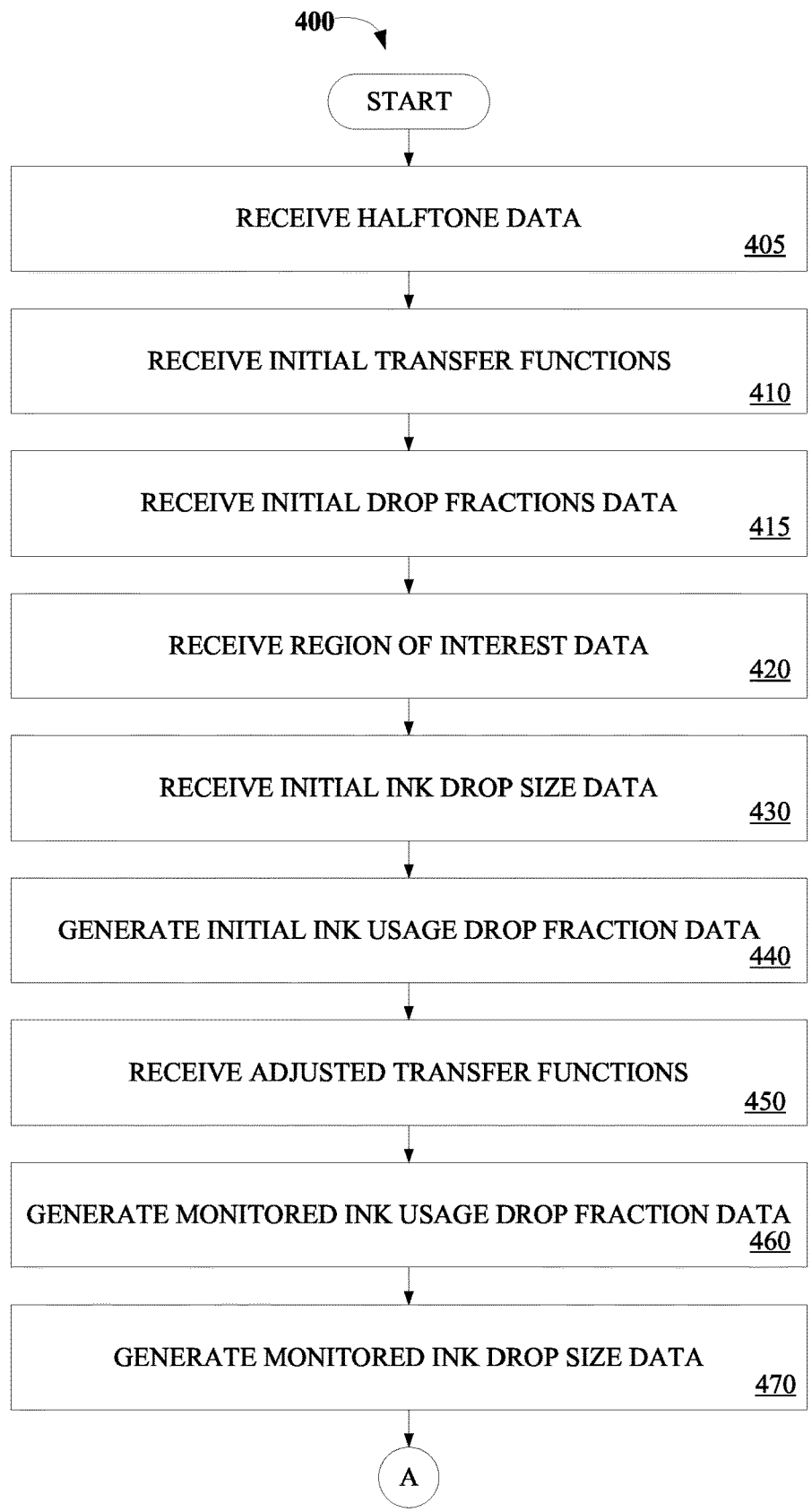
FIGS. 4A & 4B is a flow diagram illustrating one embodiment for performing a drop size monitoring process.
Figure 4B:
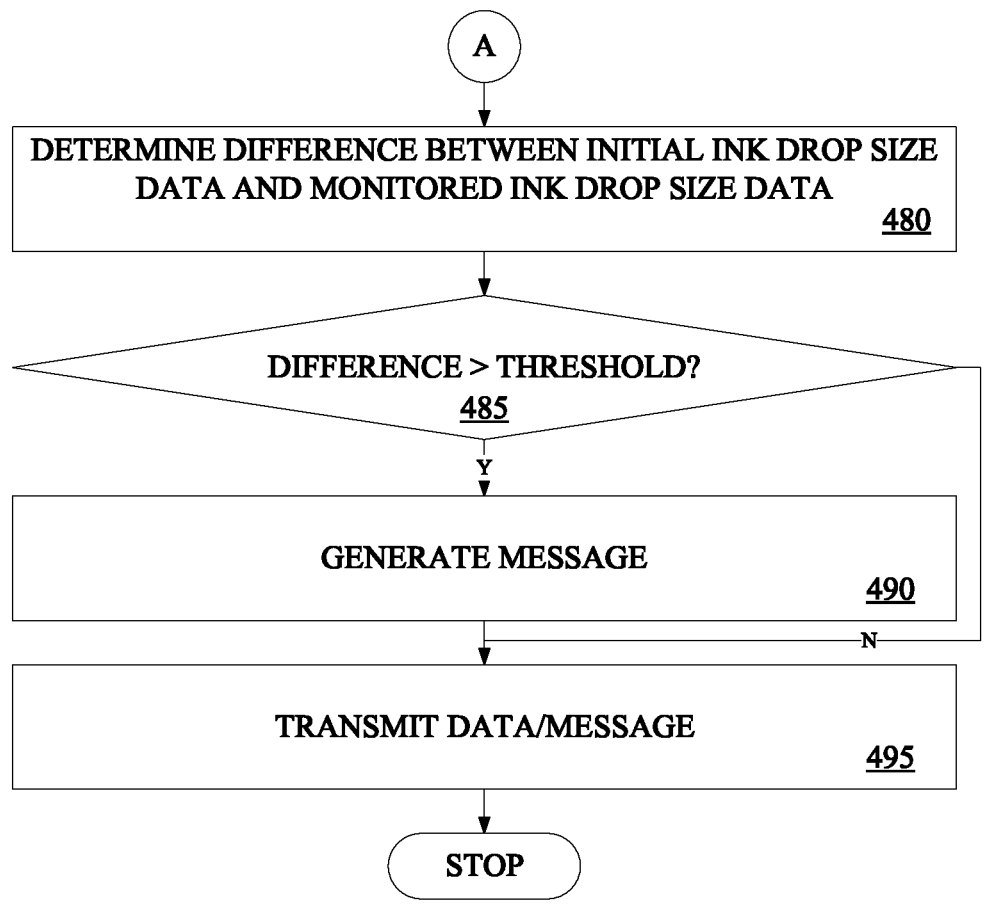

FIGS. 4A & 4B is a flow diagram illustrating one embodiment of a process 400 for performing a drop size monitoring process. Process 400 may be performed by processing logic that may include hardware (e.g., circuitry, dedicated logic, programmable logic, microcode, etc.), software such as instructions run on a processing device, or a combination thereof. In one embodiment, process 400 is performed by drop size monitor 230.

At processing block 405 (FIG. 4A), the halftone data 301 is received. At processing block 410, the initial transfer function 304 are received. At processing block 415, initial drop fraction data 303 is received which includes the impact of initial transfer function 304. At processing block 420, region of interest data 305 is received. At processing block 430, initial ink drop size data 302 is received. In one embodiment, instead of receiving initial drop fraction data 303 from outside the drop size monitor 230 as in step 415, at processing block 440, initial ink usage drop fraction data is generated for each digital count level using the halftone data 301, the initial transfer functions 304 and the print job data. As discussed above, the initial ink drop size data may be generated for one or more regions of interest specified in the region of interest data 305.

At processing block 450, the adjusted transfer functions 306 are received. At processing block 460, the monitored ink usage drop fraction data is generated for each digital count level using the halftone data 301 or a calibrated version of 301, the adjusted transfer functions 306 and the print job data (e.g., for the one or more regions of interest). At processing block 470, the monitored ink drop size data is generated for the one or more regions of interest based on the initial ink usage drop fraction data, initial ink drop size data and the monitored ink usage drop fraction data.

At processing block 480 (FIG. 4B), a difference is determined between the initial ink drop size data and the monitored ink drop size data. At decision block 485, a determination is made as to whether the difference between the initial ink drop size data and the monitored ink drop size data is greater than the threshold 307. Threshold 307 may be received (e.g., via GUI 250). If the difference is greater than the threshold, a message is generated (processing block 490) prior to transmitting the message (processing block 495) and the monitored drop size data. Otherwise, only the monitored ink drop size data is transmitted. Printer 160 may receive the message and in response perform corrective actions.

In a further embodiment, the message and monitored ink drop size data is transmitted to drop size correction logic 240 that is implemented to perform an ink drop size correction process. In this embodiment, drop size correction logic 240 performs an ink drop size correction process to adjust drop sizes upon receiving the message and data from drop size correction logic 240 indicating that the difference between the initial drop size data and the monitored drop size data exceeds the predetermined threshold. A technical advantage of process 400 is computationally efficiency and avoidance of iterations versus conventional means.

Figure 5:
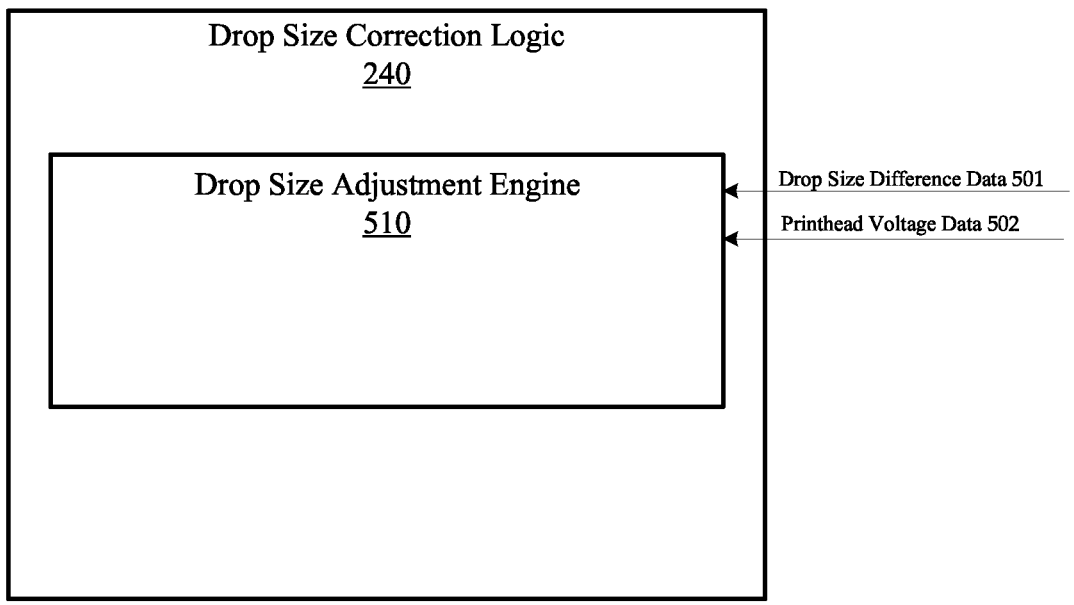
FIG. 5 illustrates one embodiment of drop size correction logic.

FIG. 5 illustrates one embodiment of drop size correction logic 240, including drop size adjustment engine 510. In this embodiment, drop size adjustment engine 510 receives drop size difference data 501 generated at drop size difference determination logic 330, as well as printhead voltage data 502 (e.g., received via GUI 250) and computes a printhead voltage adjustment based on the drop size difference data 501 and printhead voltage data 502 for the regions of interest.

According to one embodiment, drop size adjustment engine 510 performs adjustments that are driven by a drop size difference ($\delta v$) between the new drop size (e.g., indicated by the monitored drop size data) and original drop size (e.g., indicated by the initial drop size data). In this embodiment, a voltage difference ($\delta u$) (e.g., printhead voltage adjustment data) is computed using a known printhead driver voltage gain ($\gamma$), based on:

$$\delta u = \gamma \times \delta v$$

In one embodiment, the Bang-bang control law may be implemented to compute perform an adjustment. In this embodiment, there are no adjustment for printheads in instances in which: $|\delta u| < u_{DB}$, where DB is the dead band. However, for the other printheads that do not meet that criteria, printhead adjustments are made using ú=u+δu. In an alternative embodiment, a linear control law may be implemented to perform the adjustment. In this embodiment, a gain $\alpha \ni 0 < \alpha < 1$ is used, and all printheads are adjusted using ú=u+α×δu.

Figure 6:
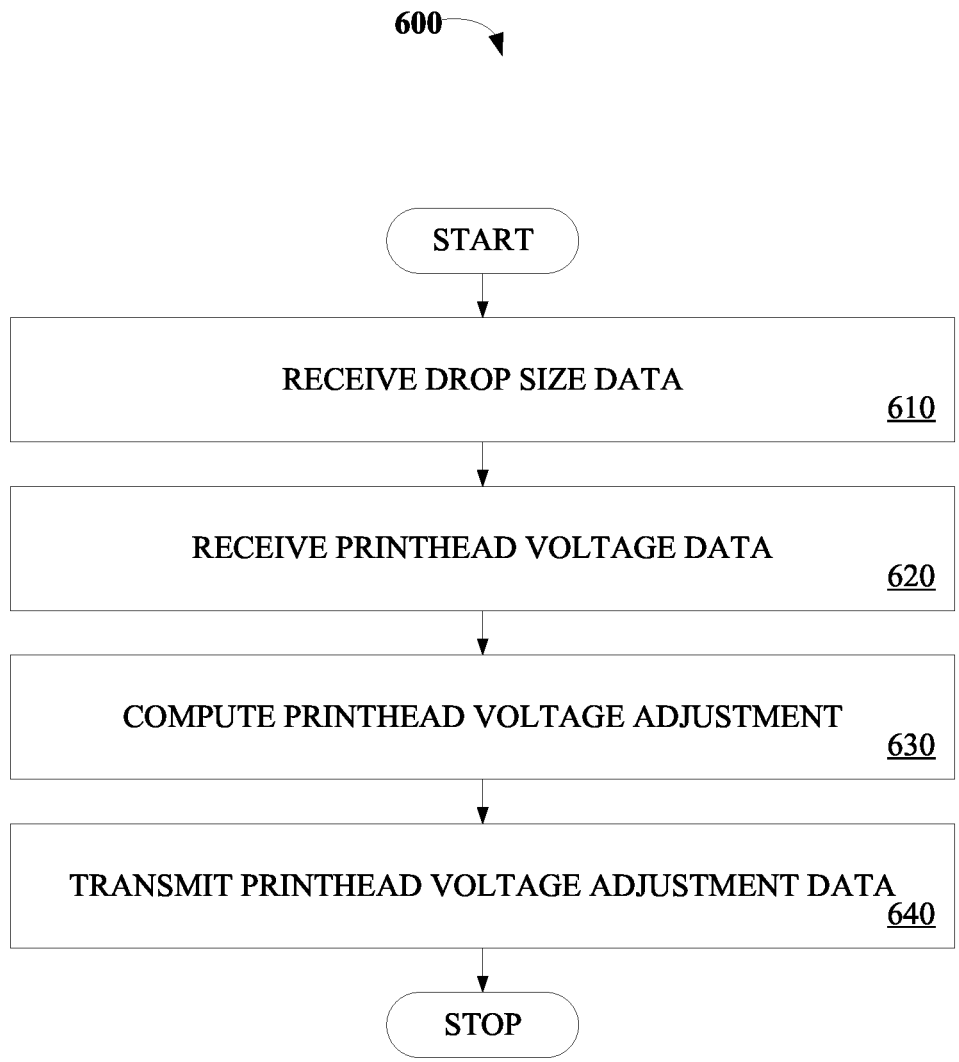
FIG. 6 is a flow diagram illustrating one embodiment of a process 600 for performing drop size correction.

FIG. 6 is a flow diagram illustrating one embodiment of a process 600 for performing drop size correction. Process 600 may be performed by processing logic that may include hardware (e.g., circuitry, dedicated logic, programmable logic, microcode, etc.), software such as instructions run on a processing device, or a combination thereof. In one embodiment, process 600 is performed by drop size adjustment engine.

At processing block 610, drop size difference data 501 is received (e.g., from drop size correction logic 240). At processing block 620, printhead voltage data 502 is received. At processing block 630, printhead voltage adjustment data are computed based on the printhead voltage data and the drop size difference data. At processing block 640, printhead voltage adjustment data are transmitted.

Print system 130 may receive the transmitted printhead voltage adjustment data and apply them to the pel forming elements (e.g., via the printhead drivers that control the corresponding pel forming elements) in the regions of interest. A technical advantage of process 600 is computationally efficiency and the avoidance of iterations versus conventional means.

Figure 7:
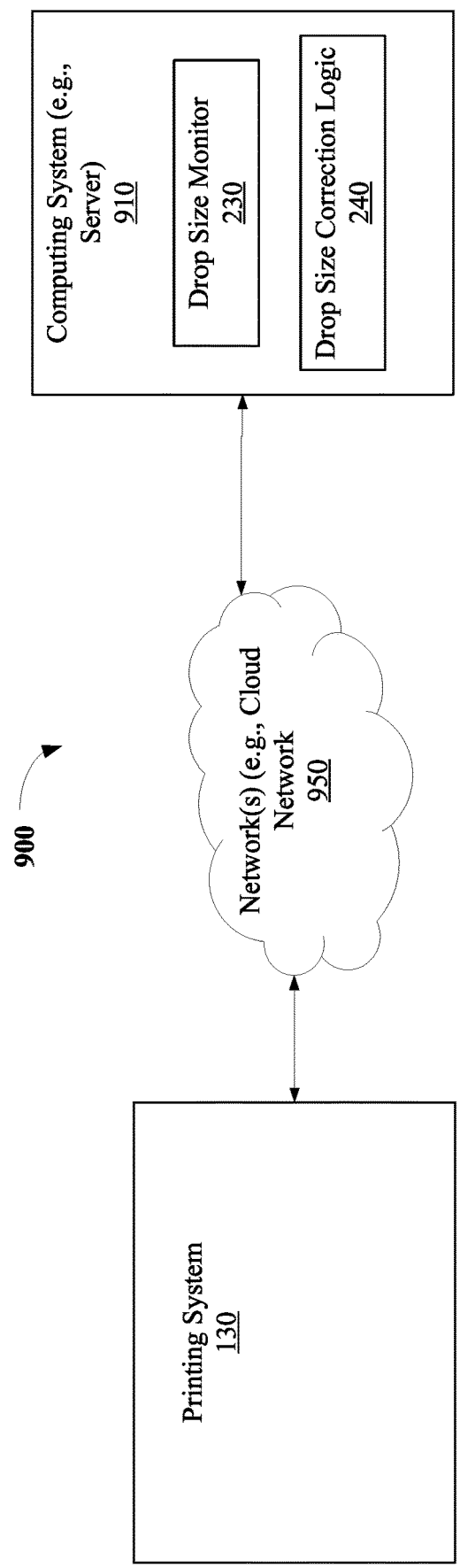
FIG. 7 illustrates one embodiment of a drop size monitor and drop size correction logic implemented in a network.

Although shown as a component of print controller 140, other embodiments may feature drop size monitor 230 and/or drop size correction logic 240 included within an independent device, or combination of devices, communicably coupled to print controller 140. For instance, FIG. 7 illustrates one embodiment of a drop size monitor 230 and drop size correction logic 240 implemented in a network 900. As shown in FIG. 7, drop size monitor 230 and drop size correction logic 240 are included within a computing system 910 and communicates with printing system 130 via a cloud network 950. Printing system 130 receives monitored ink drop size data and message(s).

Figure 8:
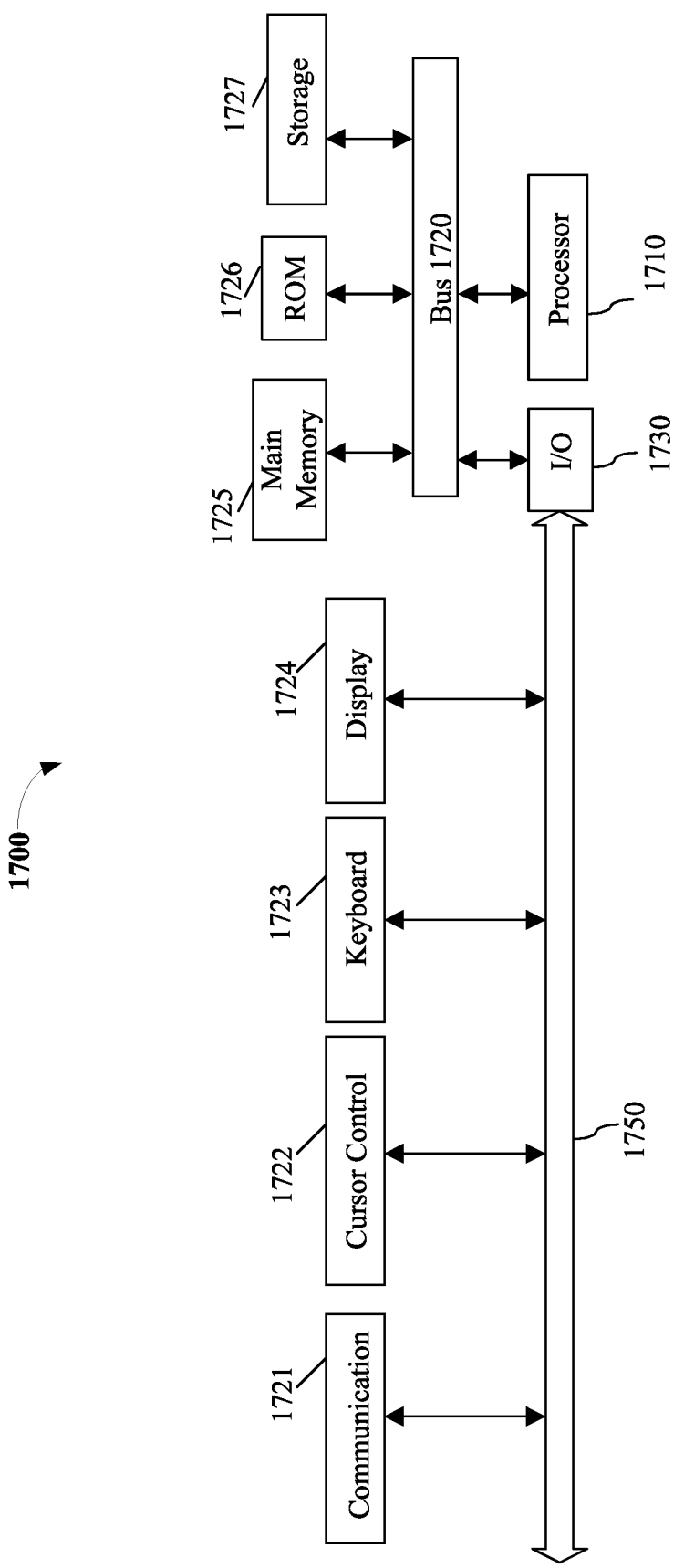
FIG. 8 illustrates one embodiment of a computer system.

FIG. 8 illustrates a computer system 1700 on which printing system 130, print controller 140, drop size monitor 230 and/or drop size correction logic 240 may be implemented. Computer system 1700 includes a system bus 1720 for communicating information, and a processor 1710 coupled to bus 1720 for processing information.

Computer system 1700 further comprises a random-access memory (RAM) or other dynamic storage device 1725 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store drop size logic and one or more processors coupled with the at least one physical memory device, to execute the drop size logic to receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module, receive first ink drop size data for each of a plurality of color planes associated with the first halftone design and the first transfer function, receive second ink usage drop fraction data for each of the plurality of color planes associated with the first halftone design, a second transfer function and the print job data and generate second ink drop size data for each of the plurality of color planes based on the first ink usage drop fraction data, the first ink drop size data and the second ink usage drop fraction data Example 2 includes the subject matter of Example 1, wherein the second ink usage drop fraction data is generated for each of a plurality of digital count levels based on the first halftone design, the second transfer function and the print job data.

Example 3 includes the subject matter of Examples 1 and 2, wherein the first ink usage drop fraction data is generated based on the first halftone design, the first transfer function, and the print job data.

Example 4 includes the subject matter of Examples 1-3, wherein the transfer functions transform the input digital counts to achieve a target output response.

Example 5 includes the subject matter of Examples 1-4, wherein the drop size logic generates the second ink drop size data for a region of interest based on the first ink usage drop fraction data for the region of interest, the first ink drop size data for the region of interest and the second ink usage drop fraction data for the region of interest.

Example 6 includes the subject matter of Examples 1-5, wherein a region of interest comprises at least one of a printhead, a printhead array and a pel forming element.

Example 7 includes the subject matter of Examples 1-6, wherein the ink drop size logic detects a difference between the first ink drop size data and the second ink drop size data and determines whether the difference between the first ink drop size data and the second ink drop size data exceeds a predetermined threshold.

Example 8 includes the subject matter of Examples 1-7, wherein the ink drop size logic initiates an ink drop size correction process upon determining that the difference between the first drop size data and the second ink drop size data exceeds the predetermined threshold.

Example 9 includes the subject matter of Examples 1-8, wherein the ink drop size correction process adjusts instructed ink drop sizes by adjusting an associated printhead driver voltage.

Example 10 includes the subject matter of Examples 1-9, further comprising a printer.

Some embodiments pertain to Example 11 that includes a method comprising receiving first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module, receiving first ink drop size data for each of a plurality of color planes associated with the first halftone design and the first transfer function, receiving second ink usage drop fraction data for each of the plurality of color planes associated with the first halftone design, a second transfer function and the print job data and generating second ink drop size data for each of the plurality of color planes based on the first ink usage drop fraction data, the first ink drop size data and the second ink usage drop fraction data.

Example 12 includes the subject matter of Example 11, wherein the second ink usage drop fraction data is generated for each of a plurality of digital count levels based on the first halftone design, the second transfer function and the print job data.

Example 13 includes the subject matter of Examples 11 and 12, wherein the first ink usage drop fraction data is generated based on the first halftone design, the first transfer function, and the print job data.

Example 14 includes the subject matter of Examples 11-13, further comprising generating the second ink drop size data for a region of interest based on the first ink usage drop fraction data for the region of interest, the first ink drop size data for the region of interest and the second ink usage drop fraction data for the region of interest.

Example 15 includes the subject matter of Examples 11-14, wherein a region of interest comprises at least one of a printhead, a printhead array and a pel forming element.

Some embodiments pertain to Example 16 that includes at least one computer readable medium having instructions stored thereon, which when executed by one or more processors, cause the processors to receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module, receive first ink drop size data for each of a plurality of color planes associated with the first halftone design and the first transfer function, receive second ink usage drop fraction data for each of the plurality of color planes associated with the first halftone design, a second transfer function and the print job data and generate second ink drop size data for each of the plurality of color planes based on the first ink usage drop fraction data, the first ink drop size data and the second ink usage drop fraction data.

Example 17 includes the subject matter of Example 16, wherein the second ink usage drop fraction data is generated for each of a plurality of digital count levels based on the first halftone design, the second transfer function and the print job data.

Example 18 includes the subject matter of Examples 16 and 17, wherein the first ink usage drop fraction data is generated based on the first halftone design, the first transfer function, and the print job data.

Example 19 includes the subject matter of Examples 16-18, having instructions stored thereon, which when executed by one or more processors, further cause the processors to generate the second ink drop size data for a region of interest based on the first ink usage drop fraction data for the region of interest, the first ink drop size data for the region of interest and the second ink usage drop fraction data for the region of interest.

Example 20 includes the subject matter of Examples 16-19, wherein a region of interest comprises at least one of a printhead, a printhead array and a pel forming element.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
at least one physical memory device to store drop size logic; and
one or more processors coupled with the at least one physical memory device, to execute the drop size logic to:
receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module;
receive first ink drop size data for each of the plurality of color planes associated with the first halftone design and the first transfer function;
receive second ink usage drop fraction data for each of the plurality of color planes associated with the first halftone design, a second transfer function and the print job data; and
generate second ink drop size data for each of the plurality of color planes based on the first ink usage drop fraction data, the first ink drop size data and the second ink usage drop fraction data.

2. The system of claim 1, wherein the second ink usage drop fraction data is generated for each of a plurality of digital count levels based on the first halftone design, the second transfer function and the print job data.

3. The system of claim 2, wherein the first ink usage drop fraction data is generated based on the first halftone design, the first transfer function, and the print job data.

4. The system of claim 2, wherein the transfer functions transform the input digital counts to achieve a target output response.

5. The system of claim 1, wherein the drop size logic generates the second ink drop size data for a region of interest based on the first ink usage drop fraction data for the region of interest, the first ink drop size data for the region of interest and the second ink usage drop fraction data for the region of interest.

6. The system of claim 5, wherein the region of interest comprises at least one of a printhead, a printhead array and a pel forming element.

7. The system of claim 1, wherein the ink drop size logic detects a difference between the first ink drop size data and the second ink drop size data and determines whether the difference between the first ink drop size data and the second ink drop size data exceeds a predetermined threshold.

8. The system of claim 7, wherein the ink drop size logic initiates an ink drop size correction process upon determining that the difference between the first drop size data and the second ink drop size data exceeds the predetermined threshold.

9. The system of claim 8, wherein the ink drop size correction process adjusts instructed ink drop sizes by adjusting an associated printhead driver voltage.

10. The system of claim 1, further comprising a printer.

11. A method comprising:
receiving first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module;
receiving first ink drop size data for each of the plurality of color planes associated with the first halftone design and the first transfer function;
receiving second ink usage drop fraction data for each of the plurality of color planes associated with the first halftone design, a second transfer function and the print job data; and
generating second ink drop size data for each of the plurality of color planes based on the first ink usage drop fraction data, the first ink drop size data and the second ink usage drop fraction data.

12. The method of claim 11, wherein the second ink usage drop fraction data is generated for each of a plurality of digital count levels based on the first halftone design, the second transfer function and the print job data.

13. The method of claim 12, wherein the first ink usage drop fraction data is generated based on the first halftone design, the first transfer function, and the print job data.

14. The method of claim 11, further comprising generating the second ink drop size data for a region of interest based on the first ink usage drop fraction data for the region of interest, the first ink drop size data for the region of interest and the second ink usage drop fraction data for the region of interest.

15. The method of claim 14, wherein the region of interest comprises at least one of a printhead, a printhead array and a pel forming element.

16. At least one non-transitory computer readable medium having instructions stored thereon, which when executed by one or more processors, cause the processors to:
receive first ink usage drop fraction data for each of a plurality of color planes associated with a first halftone design, a first transfer function, and print job data, wherein ink usage drop fraction data represents the fraction of ink drops for each instructed drop size corresponding to each input digital count for a halftoning module;
receive first ink drop size data for each of the plurality of color planes associated with the first halftone design and the first transfer function;
receive second ink usage drop fraction data for each of the plurality of color planes associated with the first halftone design, a second transfer function and the print job data; and
generate second ink drop size data for each of the plurality of color planes based on the first ink usage drop fraction data, the first ink drop size data and the second ink usage drop fraction data.

17. The computer readable medium of claim 16, wherein the second ink usage drop fraction data is generated for each of a plurality of digital count levels based on the first halftone design, the second transfer function and the print job data.

18. The computer readable medium of claim 17, wherein the first ink usage drop fraction data is generated based on the first halftone design, the first transfer function, and the print job data.

19. The computer readable medium of claim 16, having instructions stored thereon, which when executed by one or more processors, further cause the processors to generate the second ink drop size data for a region of interest based on the first ink usage drop fraction data for the region of interest, the first ink drop size data for the region of interest and the second ink usage drop fraction data for the region of interest.

20. The computer readable medium of claim 19, wherein the region of interest comprises at least one of a printhead, a printhead array and a pel forming element.

* * * * *